US008218293B2

(12) United States Patent
Fujimoto

(10) Patent No.: US 8,218,293 B2
(45) Date of Patent: Jul. 10, 2012

(54) WINDING-TYPE ELECTROLYTIC CAPACITOR AND METHOD OF MANUFACTURING THE SAME

(75) Inventor: Kazumasa Fujimoto, Saga (JP)

(73) Assignees: Sanyo Electric Co., Ltd, Moriguchi-shi (JP); Saga Sanyo Industries Co., Ltd., Kishima-gun (JP)

( * ) Notice: Subject to any disclaimer, the term of this patent is extended or adjusted under 35 U.S.C. 154(b) by 439 days.

(21) Appl. No.: 12/563,442

(22) Filed: Sep. 21, 2009

(65) Prior Publication Data

US 2010/0073850 A1    Mar. 25, 2010

(30) Foreign Application Priority Data

Sep. 22, 2008 (JP) .................. 2008-242887
Sep. 22, 2008 (JP) .................. 2008-242941

(51) Int. Cl.
*H01G 4/32* (2006.01)
*H01G 9/04* (2006.01)
(52) U.S. Cl. ...................... 361/530; 29/25.03
(58) Field of Classification Search ......... 361/530–531; 29/25.03
See application file for complete search history.

(56) References Cited

U.S. PATENT DOCUMENTS

| | | | | |
|---|---|---|---|---|
| 6,058,006 A * | 5/2000 | Yoshioka et al. | ............. | 361/511 |
| 6,454,817 B1 * | 9/2002 | Shin et al. | ............. | 29/25.03 |
| 6,885,547 B2 * | 4/2005 | Nitta et al. | ............. | 361/512 |
| 7,778,012 B2 * | 8/2010 | Fujimoto | ............. | 361/523 |
| 7,903,392 B2 * | 3/2011 | Yoshimitsu | ............. | 361/530 |
| 2006/0061940 A1 * | 3/2006 | Ueda et al. | ............. | 361/530 |
| 2010/0091433 A1 * | 4/2010 | Fujimoto et al. | ............. | 361/527 |
| 2011/0122547 A1 * | 5/2011 | Fujimoto | ............. | 361/530 |

FOREIGN PATENT DOCUMENTS

| JP | 09-082580 A | 3/1997 |
|---|---|---|
| JP | 10-144574 A | 5/1998 |

OTHER PUBLICATIONS

Chinese Office Action dated Mar. 26, 2012, issued in corresponding Chinese Patent Application No. 200910169158.0.

* cited by examiner

*Primary Examiner* — Eric Thomas
(74) *Attorney, Agent, or Firm* — Westerman, Hattori, Daniels & Adrian, LLP

(57) ABSTRACT

Provided is an electrolytic capacitor, including: an anode foil having a dielectric coating film and a conductive polymer layer formed thereon; a cathode foil having a conductive polymer layer formed thereon; an anode lead tab and a cathode lead tab electrically connected to the anode foil and the cathode foil, respectively; and a protection member. A first region provided with the protection member is present between the anode foil and the cathode foil that are wound. The first region is at least one of a region covering the anode lead tab, a region covering the cathode lead tab, a region covering a rear side of the anode foil at a connection portion between the anode lead tab and the anode foil, and a region covering a rear side of the cathode foil at a connection portion between the cathode lead tab and the cathode foil.

11 Claims, 6 Drawing Sheets

WINDING-TYPE ELECTROLYTIC CAPACITOR AND METHOD OF MANUFACTURING THE SAME

BACKGROUND OF THE INVENTION

1. Field of the Invention

The present invention relates to a winding-type electrolytic capacitor and a method of manufacturing the same.

2. Description of the Background Art

As a conventional winding-type electrolytic capacitor, the one shown in FIGS. 11 and 12 is known (Japanese Patent Laying-Open No. 10-144574).

As shown in a cross sectional view of FIG. 11, an electrolytic capacitor 1201 has a capacitor element 1206, a bottomed case 1209 accommodating capacitor element 1206, and a sealing member 1210 sealing capacitor element 1206. An anode lead 1208A and a cathode lead 1208B are connected to capacitor element 1206 through an anode lead tab 1207A and a cathode lead tab 1207B, respectively. The vicinity of an opening end of bottomed case 1209 is subjected to pressing in a lateral direction and curling.

As shown in a perspective view of FIG. 12, capacitor element 1206 is formed by winding a pair of electrode foils formed of an anode foil 1202 and a cathode foil 1203 with a separator 1212 being interposed therebetween, and securing them with a winding stop tape 1205. Anode lead 1208A is connected with anode foil 1202 through anode lead tab 1207A, and cathode lead 1208B is connected with cathode foil 1203 through cathode lead tab 1207B.

As an electrolyte of electrolytic capacitor 1201 with a configuration as described above, an electrolytic solution, a solid electrolyte, or the like is used. Such an electrolyte is charged into a gap between anode foil 1202 and cathode foil 1203 as the electrode foils of capacitor element 1206.

SUMMARY OF THE INVENTION

Electrolytic capacitor 1201 described above has a large capacitance, and is widely used in a decoupling circuit or a power supply circuit for a CPU. However, with the development in electronic equipment, it has become required to address various demands for electrolytic capacitors with a larger capacity, a smaller size, a lower ESR (Equivalent Series Resistance), and the like.

In a capacitor element used in a conventional electrolytic capacitor, it is necessary to wind an anode foil and a cathode foil with a separator being inserted entirely between the anode foil and the cathode foil in order to prevent a short circuit due to contact between the anode foil and the cathode foil. This poses an impediment to achieving an electrolytic capacitor with a lower ESR, a larger capacity, and a smaller size.

The present invention has been made to solve the above-mentioned problem. One object of the present invention is to provide a winding-type electrolytic capacitor capable of having a lower ESR, a larger capacity, and a smaller size, and a method of manufacturing the same.

A first aspect of the present invention is an electrolytic capacitor, including: an anode foil having a dielectric coating film and a conductive polymer layer formed successively on a surface thereof; a cathode foil having a conductive polymer layer formed on a surface thereof; an anode lead tab electrically connected to one surface of the anode foil; a cathode lead tab electrically connected to one surface of the cathode foil; and a protection member disposed on the surface(s) of the anode foil and/or the cathode foil, wherein the anode foil and the cathode foil are wound with no separator being interposed therebetween, and a first region provided with the protection member and a second region not provided with the protection member are present between the anode foil and the cathode foil that are wound, and the first region is at least one of a region covering the anode lead tab connected to the anode foil, a region covering the cathode lead tab connected to the cathode foil, a region covering a rear side of the anode foil at a connection portion between the anode lead tab and the anode foil, and a region covering a rear side of the cathode foil at a connection portion between the cathode lead tab and the cathode foil.

In the first aspect, the first region preferably includes all of the region covering the anode lead tab connected to the anode foil, the region covering the cathode lead tab connected to the cathode foil, the region covering the rear side of the anode foil at the connection portion between the anode lead tab and the anode foil, and the region covering the rear side of the cathode foil at the connection portion between the cathode lead tab and the cathode foil.

In the first aspect, the protection member preferably extends in a winding direction of a capacitor element, within a range of half a perimeter or less.

In the first aspect, the protection member is preferably a sheet-type member made of any of a natural fiber, a synthetic resin, and a conductive polymer.

In the first aspect, the second region is preferably filled with a conductive polymer.

A second aspect of the present invention is a method of manufacturing an electrolytic capacitor, including the steps of: successively forming a dielectric coating film and a conductive polymer layer on a surface of an anode foil, and forming a conductive polymer layer on a surface of a cathode foil; connecting an anode lead tab and a cathode lead tab to one surface of the anode foil and one surface of the cathode foil, respectively; disposing a protection member at least one of a region covering the anode lead tab connected to the anode foil, a region covering the cathode lead tab connected to the cathode foil, a region covering a rear side of the anode foil at a connection portion between the anode lead tab and the anode foil, and a region covering a rear side of the cathode foil at a connection portion between the cathode lead tab and the cathode foil; and winding the anode foil and the cathode foil with no separator being interposed therebetween.

In the second aspect, the protection member is preferably formed by applying resin to at least one of the region covering the anode lead tab connected to the anode foil, the region covering the cathode lead tab connected to the cathode foil, the region covering the rear side of the anode foil at the connection portion between the anode lead tab and the anode foil, and the region covering the rear side of the cathode foil at the connection portion between the cathode lead tab and the cathode foil.

A third aspect of the present invention is an electrolytic capacitor, including: an anode foil having a dielectric coating film and a conductive polymer layer formed successively on a surface thereof; a cathode foil having a conductive polymer layer formed on a surface thereof; and a sheet member disposed to cover at least one of a surface on an outer circumferential side of a winding start portion of the anode foil, a surface on an inner circumferential side of the winding start portion of the anode foil, a surface on an outer circumferential side of a winding start portion of the cathode foil, and a surface on an inner circumferential side of the winding start portion of the cathode foil, the anode foil and the cathode foil being wound with no separator being interposed therebetween.

In the third aspect, one end of the sheet member preferably extends in a longitudinal direction from one end of the winding start portion of the anode foil and/or one end of the winding start portion of the cathode foil.

In the third aspect, the sheet member is preferably made of any of a natural fiber, a synthetic resin, and a conductive polymer.

In the third aspect, a gap between the anode foil and the cathode foil is preferably filled with a conductive polymer.

A fourth aspect of the present invention is a method of manufacturing an electrolytic capacitor, including the steps of: successively forming a dielectric coating film and a conductive polymer layer on a surface of an anode foil, and forming a conductive polymer layer on a surface of a cathode foil; disposing a sheet member to cover at least one of a surface on an outer circumferential side of a winding start portion of the anode foil, a surface on an inner circumferential side of the winding start portion of the anode foil, a surface on an outer circumferential side of a winding start portion of the cathode foil, and a surface on an inner circumferential side of the winding start portion of the cathode foil; and winding the anode foil and the cathode foil with no separator being interposed therebetween.

It is preferable in the fourth aspect that, in the step of disposing a sheet member, the sheet member is disposed to extend in a longitudinal direction from one end of the winding start portion of the anode foil and/or one end of the winding start portion of the cathode foil, and in the step of winding, firstly, only the sheet member extending from the one end is wound, and then the one ends of the anode foil and the cathode foil are wound together with the sheet member.

EFFECTS OF THE INVENTION

According to the first aspect of the present invention, there is no need to interpose a separator between an anode foil and a cathode foil, as the anode foil and the cathode foil have a conductive polymer layer on surfaces thereof. Further, a short circuit between the anode foil and the cathode foil can be avoided by covering a connection portion and/or a contact portion between the anode foil and/or the cathode foil and a lead tab(s) with a protection member. Therefore, an electrolytic capacitor can have a lower ESR, a larger capacity, and a smaller size.

According to the second aspect of the present invention, an electrolytic capacitor can be fabricated without using a separator by forming a conductive polymer layer on surfaces of an anode foil and a cathode foil beforehand. Further, a short circuit between the anode foil and the cathode foil can be avoided by covering a connection portion and/or a contact portion between the anode foil and/or the cathode foil and a lead tab(s) with a protection member. Therefore, an electrolytic capacitor capable of having a lower ESR, a larger capacity, and a smaller size can be manufactured.

According to the third aspect of the present invention, there is no need to interpose a separator between an anode foil and a cathode foil, as the anode foil and the cathode foil have a conductive polymer layer on surfaces thereof. Further, winding is performed with a winding start portion(s) of the anode foil and/or the cathode foil of a capacitor element being covered with a sheet member. That is, the sheet member is disposed at a portion of the anode foil and/or the cathode foil that is bent along an edge of a winding core. Since this can prevent damage due to contact between the anode foil and/or the cathode foil and an edge portion of the winding core, a short circuit between the anode foil and the cathode foil can be avoided. Therefore, an electrolytic capacitor can have a lower ESR, a larger capacity, and a smaller size.

According to the fourth aspect of the present invention, an electrolytic capacitor can be fabricated without using a separator by forming a conductive polymer layer on surfaces of an anode foil and a cathode foil beforehand. Further, a capacitor element is wound with a winding start portion(s) of the anode foil and/or the cathode foil being covered with a sheet member. That is, the sheet member is disposed at a portion of the anode foil and/or the cathode foil that is bent along an edge of a winding core. This can prevent damage to winding start portions of electrode foils, and as a result, can avoid a short circuit between the anode foil and the cathode foil. Therefore, an electrolytic capacitor can have a lower ESR, a larger capacity, and a smaller size.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described.

<First Embodiment>

Figure 1:
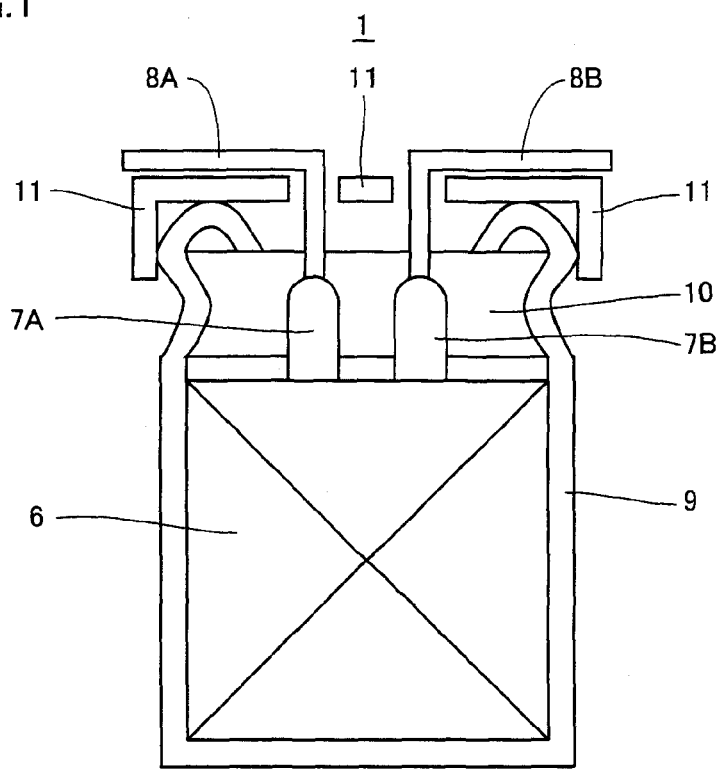
FIG. 1 is a cross sectional view of an electrolytic capacitor in accordance with a first embodiment.

In FIG. 1, an electrolytic capacitor 1 includes a capacitor element 6, an anode lead tab 7A, a cathode lead tab 7B, an anode lead 8A, a cathode lead 8B, a bottomed case 9, a sealing member 10, and a seat plate 11. Anode lead 8A and cathode lead 8B are connected to an anode foil and a cathode foil (described later) constituting capacitor element 6, through anode lead tab 7A and cathode lead tab 7B, respectively.

Capacitor element 6 is accommodated in bottomed case 9 such that a surface thereof onto which lead tabs 7A and 7B are connected is located at an opening end portion of bottomed case 9. Capacitor element 6 is sealed within bottomed case 9 by disposing sealing member 10 at an opening of bottomed case 9.

Figure 2:
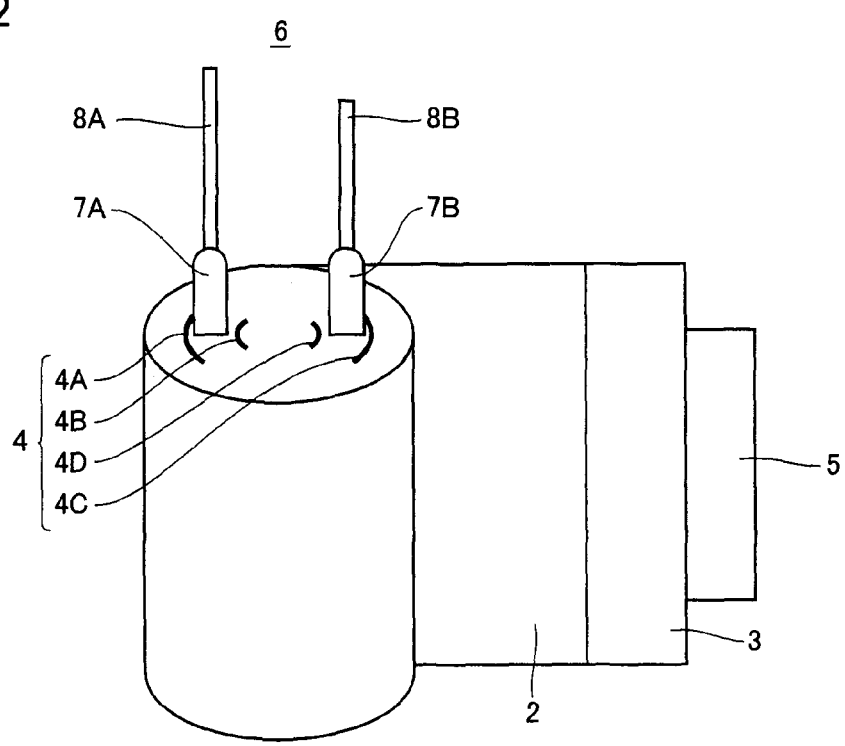
FIG. 2 is a perspective view of a capacitor element in accordance with the first embodiment.

As shown in FIG. 2, capacitor element 6 includes electrode foils formed of an anode foil 2 having a dielectric coating film (not shown) and a conductive polymer layer (not shown) formed successively on a surface thereof, and a cathode foil 3 having a conductive polymer layer (not shown) formed on a surface thereof. Anode foil 2 and cathode foil 3 are wound in a state where they are adjacent to each other, with no separator being interposed therebetween. The outermost periphery of a cylindrical body formed by winding anode foil 2 and cathode foil 3 is secured with a winding stop tape 5.

The dielectric coating film can be formed by performing chemical conversion treatment on a surface of at least anode foil 2, among anode foil 2 and cathode foil 3 made of a valve metal. Chemical conversion treatment is performed, for example, by immersing the electrode foil in a chemical conversion solution and applying voltage.

The conductive polymer layer preferably contains at least one or more conductive polymers of the aliphatic series, the aromatic series, the heterocyclic series, and the heteroatom-containing series. In particular, the conductive polymer layer can be formed stably by containing a polythiophene, polypyrrole, or polyaniline conductive polymer. Examples of a method of forming a conductive polymer layer include a method of coating the surfaces of the electrode foils with a conductive polymer solution or a conductive polymer dispersion liquid in which fine particles of a conductive polymer are dispersed.

Anode lead tab 7A is electrically connected to one surface of anode foil 2, and cathode lead tab 7B is electrically connected to one surface of cathode foil 3. Preferably, a dielectric coating film is formed on a surface of at least anode lead tab 7A.

According to the present embodiment, the conductive polymer layer is formed on the surfaces of anode foil 2 and cathode foil 3, and thereby no short circuit occurs even when anode foil 2 comes into contact with cathode foil 3. Therefore, there is no need to interpose a separator entirely between the anode foil and the cathode foil as required in a conventional electrolytic capacitor.

However, a connection portion between anode foil 2 and anode lead tab 7A and a connection portion between cathode foil 3 and cathode lead tab 7B come into contact with the electrode foils located on an outer circumferential side and an inner circumferential side of each connection portion, and damage the dielectric coating film and the conductive polymer layers on the surfaces of the electrode foils. As a result, a short circuit is likely to occur between anode foil 2 and cathode foil 3.

To prevent such a situation, in the present invention, a protection member 4 is disposed on the surface(s) of anode foil 2 and/or cathode foil 3. Hereinafter, a position where protection member 4 is disposed will be described with reference to FIG. 3.

Figure 3:
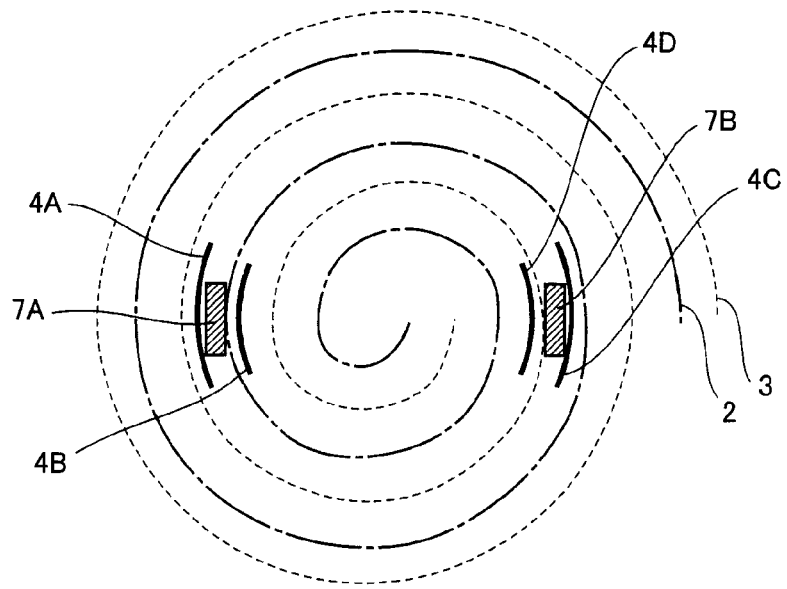
FIG. 3 shows positional relation among electrode foils, lead tabs, and protection members.

FIG. 3 shows positional relation among electrode foils, lead tabs, and protection members, which is a schematic view of the cylindrical body formed of the wound electrode foils of FIG. 2 as seen from above.

In FIG. 3, a protection member 4A is disposed at a region covering anode lead tab 7A, and a protection member 4B is disposed at a region covering a rear surface of the connection portion of anode foil 2 connected with anode lead tab 7A. In addition, a protection member 4C is disposed at a region covering cathode lead tab 7B, and a protection member 4D is disposed at a region covering a rear surface of the connection portion of cathode foil 3 connected with cathode lead tab 7B.

This structure can prevent the connection portions connected with the lead tabs from coming into contact with the electrode foils located on the outer circumferential side and the inner circumferential side thereof in a wound state, and avoid a short circuit between anode foil 2 and cathode foil 3. Therefore, an electrolytic capacitor capable of having a lower ESR, a larger capacity, and a smaller size can be manufactured.

In a case where the capacitor element has three or more lead tabs, it is preferable to provide protection members in the number corresponding to connection portions between the lead tabs and the electrode foils. Further, the protection member can also prevent a short circuit by providing at least one of protection members 4A to 4D.

Protection member 4 can be of any width as long as it covers the lead tab. Protection member 4 can be of any length as long as it is longer than the connection portion between the electrode foil and the lead tab and does not reach a winding start edge and a winding end edge of the electrode foil. Preferably, protection member 4 extends in a winding direction of capacitor element 6, within a range of half a perimeter or less, to achieve a smaller size and reduce material cost. More preferably, the length of protection member 4 is about 1.5 times the lateral width of the lead tab, to deal with displacement of protection member 4 during winding.

Protection member 4 can be of any strength as long as it can protect anode foil 2 and cathode foil 3. Unlike a conventionally used separator, presence or absence of ion permeability is not considered. As protection member 4, for example, a natural fiber such as Manila hemp, esparto pulp, kraft, wood pulp, or the like; a synthetic resin such as nylon, acryl, vinylon, aramid, Teflon (registered trademark), or the like; and a conductive polymer such as a polythiophene, polypyrrole, or polyaniline conductive polymer can be used.

Examples of a method of disposing protection member 4 at a position covering the connection portion of the electrode foil connected with the lead tab, and/or at a contact portion of the electrode foil brought into contact with the lead tab include a method of inserting protection member 4 into a prescribed position when winding anode foil 2 and cathode foil 3, a method of directly bonding protection member 4 beforehand to a prescribed position on anode foil 2 and cathode foil 3 using an adhesive and then winding anode foil 2 and cathode foil 3, and the like.

It is also possible to directly form protection members 4 at the connection portion and the contact portion by applying resin to the connection portion and the contact portion and drying the resin, and then perform winding. Any resin may be used as long as it can protect electrode foils 2 and 3. For example, resin such as epoxy, phenol, polyethylene, or the like may be used.

Further, a sheet member 14 in accordance with a second embodiment described later may be provided to capacitor element 6 in accordance with the present embodiment.

Next, a method of manufacturing electrolytic capacitor 1 in accordance with the first embodiment described above will be described with reference to FIG. 4.

Figure 4:
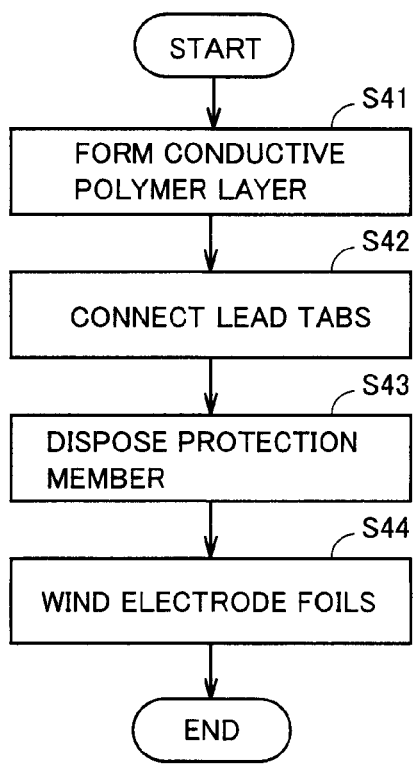
FIG. 4 is a flowchart of a process of manufacturing the electrolytic capacitor in accordance with the first embodiment.

In FIG. 4, firstly, a dielectric coating film is formed by performing chemical conversion treatment on a surface of at least anode foil 2, among anode foil 2 and cathode foil 3 made of a valve metal. Chemical conversion treatment is performed, for example, by immersing the electrode foil in a chemical conversion solution and applying voltage.

Then, a conductive polymer layer is formed on the surfaces of anode foil 2 having the dielectric coating film formed thereon and cathode foil 3 (step S41). The conductive polymer layer preferably contains at least one or more conductive polymers of the aliphatic series, the aromatic series, the heterocyclic series, and the heteroatom-containing series. In particular, a polythiophene, polypyrrole, or polyaniline conductive polymer is preferable. Examples of a method of forming a conductive polymer layer include a method of coating the surfaces of the electrode foils with a conductive polymer solution or a conductive polymer dispersion liquid in which fine particles of a conductive polymer are dispersed.

Next, anode lead tab 7A and cathode lead tab 7B are electrically connected to anode foil 2 and cathode foil 3 having the conductive polymer layers formed thereon, respectively (step S42). Preferably, a dielectric coating film is formed on a surface of at least anode lead tab 7A.

Protection member 4 is disposed on the surfaces of anode foil 2 and cathode foil 3 to prevent contact between electrode foils 2, 3 and lead tabs 7A, 7B at a portion other than the connecting portions between electrode foils 2, 3 and lead tabs 7A, 7B (step S43). Examples of a region at which protection member 4 is disposed include a region covering anode lead tab 7A connected to anode foil 2, a region covering cathode lead tab 7B connected to cathode foil 3, a region covering a rear side of anode foil 2 at the connection portion between anode lead tab 7A and anode foil 2, and a region covering a rear side of cathode foil 3 at the connection portion between cathode lead tab 7B and cathode foil 3. Protection member 4 only needs to be disposed at least one of these regions.

Subsequently, anode foil 2 and cathode foil 3 are wound with no separator being interposed therebetween (step S44), and the outermost periphery is secured with winding stop tape 5. Thereby, capacitor element 6 is fabricated.

Then, fabricated capacitor element 6 is subjected to chemical conversion treatment of a cut section, and a dielectric coating film is formed on end surfaces of anode foil 2 and cathode foil 3. Chemical conversion treatment of a cut section is performed by immersing the capacitor element in a chemical conversion solution and applying voltage.

Subsequently, a conductive polymer layer is formed at a gap between anode foil 2 and cathode foil 3 of capacitor element 6 by electrolytic polymerization or chemical polymerization. The conductive polymer layer preferably contains at least one or more conductive polymers of the aliphatic series, the aromatic series, the heterocyclic series, and the heteroatom-containing series. In particular, a polythiophene, polypyrrole, or polyaniline conductive polymer is preferable. Further, instead of a conductive polymer, capacitor element 6 may be impregnated with an electrolytic solution.

Thereafter, capacitor element 6 is accommodated in bottomed case 9, and sealing member 10 is inserted into the opening end portion of bottomed case 9, which is then subjected to pressing in a lateral direction and curling. Then, seat plate 11 is provided on a curled surface, and leads 8A and 8B are pressed and bent as electrode terminals to complete electrolytic capacitor 1.

As described above, according to the present embodiment, an electrolytic capacitor can be fabricated without using a separator by forming a conductive polymer layer on the surfaces of anode foil 2 and cathode foil 3 beforehand. Further, a short circuit between anode foil 2 and cathode foil 3 can be avoided by covering the connection portion and the contact portion between electrode foils 2, 3 and lead tabs 7A, 7B with protection members 4. Therefore, an electrolytic capacitor capable of having a lower ESR, a larger capacity, and a smaller size can be manufactured.

<Second Embodiment>

Figure 5:
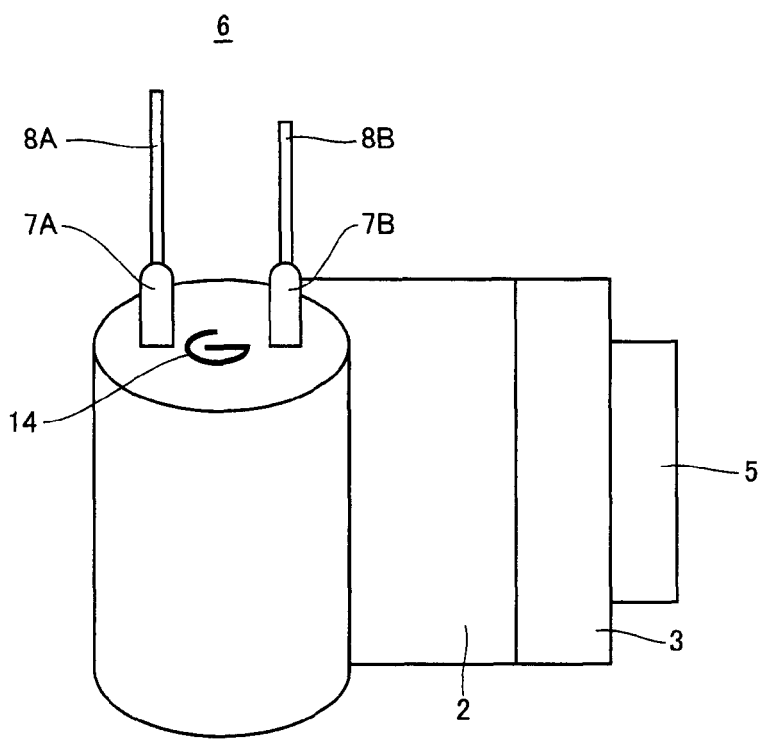
FIG. 5 is a perspective view of a capacitor element in accordance with a second embodiment.

FIG. 5 is a perspective view of a capacitor element in accordance with a second embodiment. Since the exterior configuration of an electrolytic capacitor is the same as that in electrolytic capacitor 1 of FIG. 1, description thereof will not be repeated.

In FIG. 5, capacitor element 6 includes electrode foils formed of anode foil 2 having a dielectric coating film (not shown) and a conductive polymer layer (not shown) formed successively on a surface thereof, and cathode foil 3 having a conductive polymer layer (not shown) formed on a surface thereof. Anode foil 2 and cathode foil 3 are wound in a state where they are adjacent to each other, with no separator being interposed therebetween. The outermost periphery of a cylindrical body formed by winding anode foil 2 and cathode foil 3 is secured with winding stop tape 5.

The dielectric coating film can be formed by performing chemical conversion treatment on a surface of at least anode foil 2, among anode foil 2 and cathode foil 3 made of a valve metal. Chemical conversion treatment is performed, for example, by immersing the electrode foil in a chemical conversion solution and applying voltage.

The conductive polymer layer preferably contains at least one or more conductive polymers of the aliphatic series, the aromatic series, the heterocyclic series, and the heteroatom-containing series. In particular, the conductive polymer layer can be formed stably by containing a polythiophene, polypyrrole, or polyaniline conductive polymer. Examples of a method of forming a conductive polymer layer include a method of coating the surfaces of the electrode foils with a conductive polymer solution or a conductive polymer dispersion liquid in which fine particles of a conductive polymer are dispersed.

Anode lead tab 7A is electrically connected to one surface of anode foil 2, and cathode lead tab 7B is electrically connected to one surface of cathode foil 3. Preferably, a dielectric coating film is formed on a surface of at least anode lead tab 7A.

According to the present embodiment, the conductive polymer layer is formed on the surfaces of anode foil 2 and cathode foil 3, and thereby no short circuit occurs even when anode foil 2 comes into contact with cathode foil 3. Therefore, there is no need to interpose a separator entirely between the anode foil and the cathode foil as required in a conventional electrolytic capacitor.

Figure 6A:
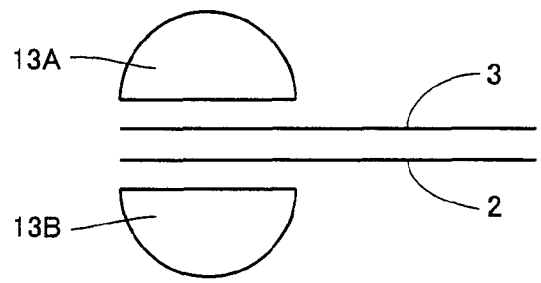
FIGS. 6A and 6B are views of the vicinity of a winding core in a case where winding is performed with no sheet member being inserted in winding start portions of electrode foils.
Figure 6B:
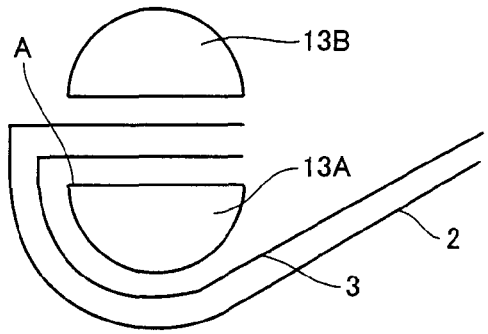

However, since capacitor element 6 does not have a separator when anode foil 2 and cathode foil 3 are wound by a winding machine, winding start portions at one end portions of anode foil 2 and cathode foil 3 are inserted between opposing surfaces of winding core pieces 13A and 13B constituting a winding core 13 of the winding machine as shown in FIG. 6A, and wound around winding core 13 as shown in FIG. 6B. In this case, anode foil 2 and/or cathode foil 3 come(s) into contact with an edge portion A of the winding core, and thereby the dielectric coating film and the conductive polymer layer on the surface(s) of anode foil 2 and/or cathode foil 3 are damaged. As a result, a short circuit is likely to occur between anode foil 2 and cathode foil 3. To prevent such a situation, in the present invention, sheet member 14 is disposed at the vicinity of a central portion of the cylindrical body formed by winding anode foil 2 and cathode foil 3, as shown in FIG. 5. Hereinafter, a position where sheet member 14 is disposed will be described.

Figure 7A:
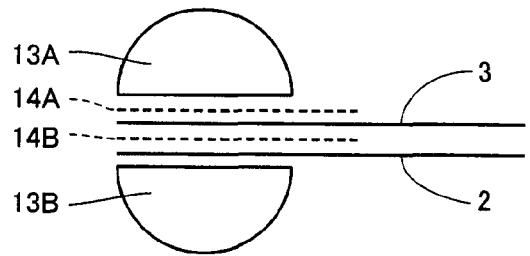
FIGS. 7A and 7B are views of the vicinity of a winding core in a case where winding is performed with a sheet member being inserted in winding start portions of electrode foils.
Figure 7B:
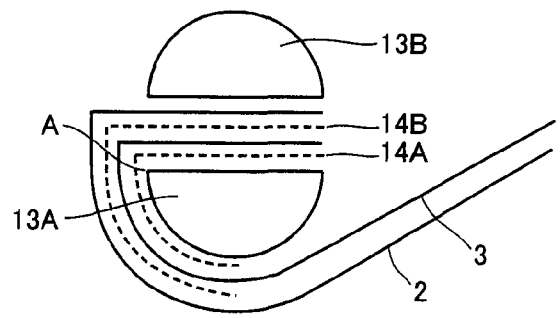

FIGS. 7A and 7B are views of the vicinity of the winding core at the time of winding, which are views for illustrating a configuration in which the electrode foils are wound around the winding core. FIGS. 7A and 7B show a state as seen from above in an axial direction of the winding core.

As shown in FIG. 7A, with the winding start portions at one end portions of anode foil 2 and cathode foil 3 being inserted between the opposing surfaces of winding core pieces 13A and 13B, sheet member 14 is disposed to cover the winding start portions of anode foil 2 and cathode foil 3. Specifically, a sheet member 14A is disposed between cathode foil 3 and winding core piece 13A to cover a surface on an inner circumferential side of the winding start portion of cathode foil 3. Further, a sheet member 14B is disposed between anode foil 2 and cathode foil 3 to cover a surface on an outer circumferential side of the winding start portion of cathode foil 3 and a surface on an inner circumferential side of the winding start portion of anode foil 2.

When winding core 13 is rotated in a clockwise direction, anode foil 2, cathode foil 3, and sheet members 14A and 14B are wound together, as shown in FIG. 7B. Since the winding start portions of anode foil 2 and cathode foil 3 of the capacitor element wound as described above are wound together with sheet members 14A and 14B, contact between edge portion A of winding core 13 and anode foil 2 and cathode foil 3 can be prevented. Therefore, an electrolytic capacitor capable of having a lower ESR, a larger capacity, and a smaller size can be manufactured.

Figure 8A:
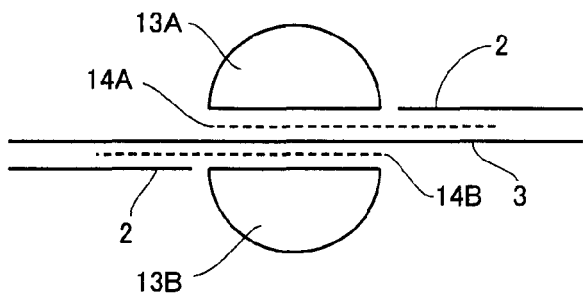
FIGS. 8A and 8B are views of the vicinity of a winding core in a case where winding is performed using a central portion of an electrode foil as a winding start portion, with a sheet member being inserted in the winding start portion.
Figure 8B:
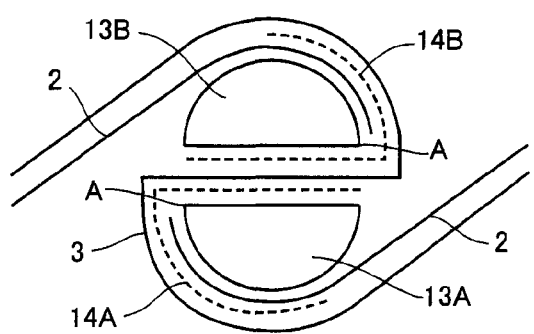

The winding start portions may not be end portions of anode foil 2 and cathode foil 3. FIGS. 8A and 8B are views of the vicinity of the winding core in a case where winding is performed using a central portion of an electrode foil as a winding start portion, with a sheet member being inserted in the winding start portion.

As shown in FIG. 8A, sheet members 14A and 14B are disposed to cover a central portion in a longitudinal direction of cathode foil 3, and inserted between winding core pieces 13A and 13B. Two anode foils 2 are disposed to face both surfaces of cathode foil 3, with one of anode foils 2 being disposed on one side of winding core 13, and the other of anode foils 2 being disposed on the other side of winding core 13. When winding core 13 is rotated in the clockwise direction, anode foil 2, cathode foil 3, and sheet members 14A and 14B are wound as shown in FIG. 8B. Thereby, contact between edge portions A of winding core pieces 13A and 13B and anode foil 2 and cathode foil 3 can be prevented. As described above, the winding start portion of the electrode foil may be not only the end portion of the electrode foil but also the central portion in the longitudinal direction of the electrode foil.

Figure 9A:
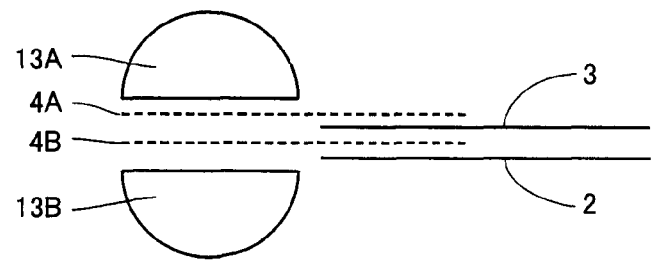
FIGS. 9A and 9B are views of the vicinity of a winding core in a case where winding is performed by winding a sheet member and causing winding start portions of electrode foils to be caught in the sheet member and wound together.
Figure 9B:
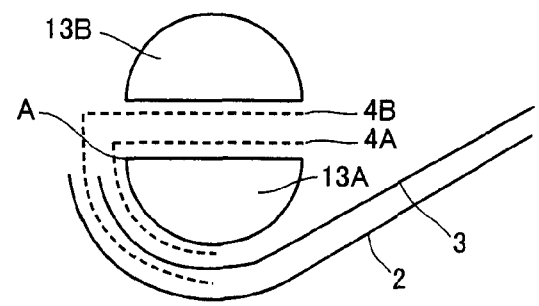

Further, winding may be performed with only sheet member 14 being inserted between winding core pieces 13A and 13B, without inserting anode foil 2 and cathode foil 3 therebetween. FIGS. 9A and 9B are views of the vicinity of the winding core in a case where winding is performed by winding a sheet member and causing the winding start portions of the electrode foils to be caught in the sheet member and wound together.

As shown in FIG. 9A, sheet members 14A and 14B are disposed such that one end portions thereof cover the winding start portions at end portions of anode foil 2 and cathode foil 3, and the other end portions thereof extend from the winding start portions of anode foil 2 and cathode foil 3 to between winding core pieces 13A and 13B. Specifically, the other end portions of sheet members 14A and 14B extend to a central portion of capacitor element 6 and are inserted between winding core pieces 13A and 13B.

When winding core 13 is rotated in the clockwise direction, sheet members 14A and 14B are wound, and anode foil 2 and cathode foil 3 are caught and wound as shown in FIG. 9B. In this case, only sheet members 14 are inserted in winding core 13, and anode foil 2 and cathode foil 3 are not inserted in winding core 13. Therefore, contact between edge portion A of winding core 13 and anode foil 2 and cathode foil 3 can be prevented.

Any number of sheet member 14 can be used as long as it is at least one or more, and the number can be modified as appropriate depending on a contact portion between the electrode foil and the edge portion of the winding core, the number of the electrode foils, and the like.

Further, sheet member 14 may be bonded to the winding start portions of anode foil 2 and cathode foil 3 using an adhesive, before winding. As an adhesive, an ordinary adhesive may be used, and for example, an acrylic, silicone, or rubber-based adhesive can be used.

Sheet member 14 can be of any strength as long as it can protect anode foil 2 and cathode foil 3 and allows winding of anode foil 2 and cathode foil 3. Unlike a conventionally used separator, presence or absence of ion permeability is not considered. As sheet member 14, for example, a natural fiber such as Manila hemp, esparto pulp, kraft, wood pulp, or the like; a synthetic resin such as nylon, acryl, vinylon, aramid, Teflon (registered trademark), or the like; and a conductive polymer such as a polythiophene, polypyrrole, or polyaniline conductive polymer can be used.

Further, protection member 4 in accordance with the first embodiment may be provided to capacitor element 6 in accordance with the present embodiment.

Next, a method of manufacturing the electrolytic capacitor in accordance with the second embodiment described above will be described with reference to FIG. 10.

Figure 10:
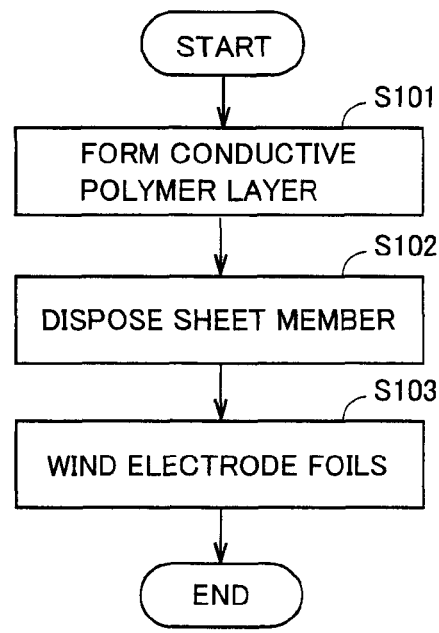
FIG. 10 is a flowchart of a process of manufacturing an electrolytic capacitor in accordance with the second embodiment.
Figure 11:
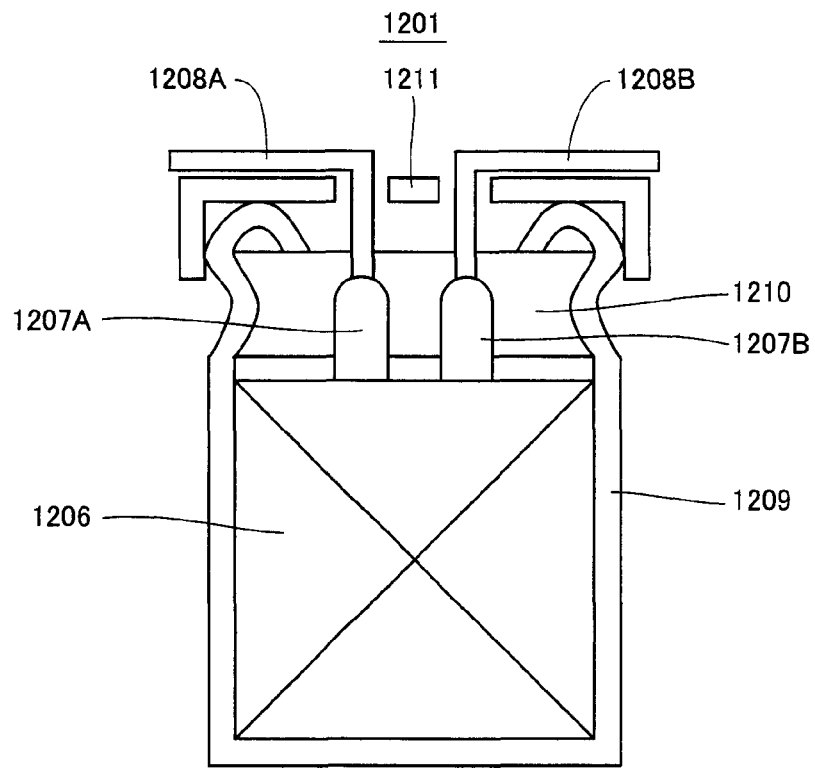
FIG. 11 is a cross sectional view of a conventional electrolytic capacitor.
Figure 12:
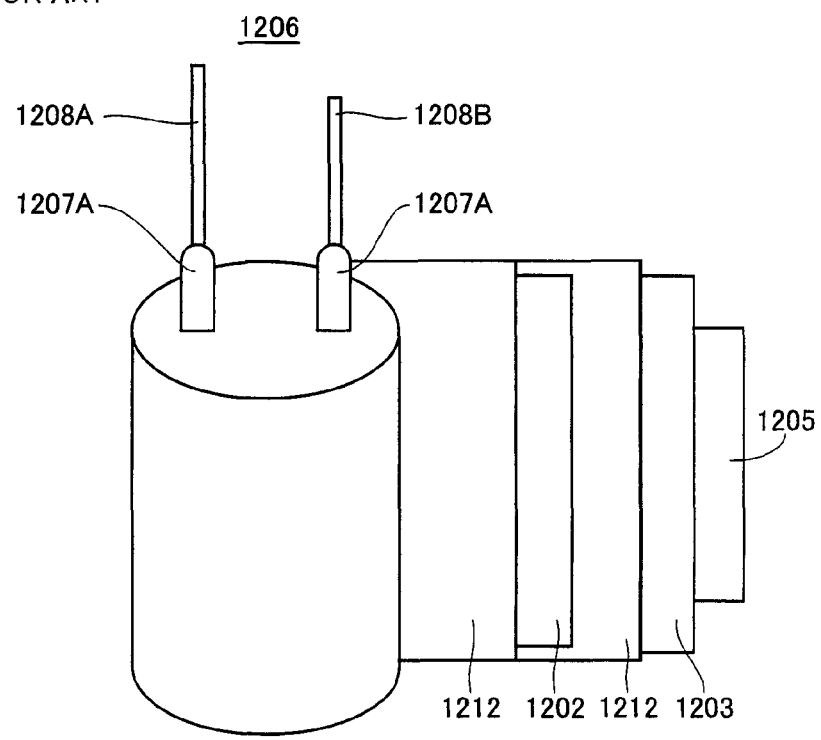
FIG. 12 is a perspective view of a conventional capacitor element.

In FIG. 10, firstly, a dielectric coating film is formed by performing chemical conversion treatment on a surface of at least anode foil 2, among anode foil 2 and cathode foil 3 made of a valve metal. Chemical conversion treatment is performed, for example, by immersing the electrode foil in a chemical conversion solution and applying voltage.

Then, a conductive polymer layer is formed on the surfaces of anode foil 2 having the dielectric coating film formed thereon and cathode foil 3 (step S101). The conductive polymer layer preferably contains at least one or more conductive polymers of the aliphatic series, the aromatic series, the heterocyclic series, and the heteroatom-containing series. In particular, a polythiophene, polypyrrole, or polyaniline conductive polymer is preferable. Examples of a method of forming a conductive polymer layer include a method of coating the surfaces of the electrode foils with a conductive polymer solution or a conductive polymer dispersion liquid in which fine particles of a conductive polymer are dispersed.

Next, anode lead tab 7A and cathode lead tab 7B are electrically connected to anode foil 2 and cathode foil 3 having the conductive polymer layers formed thereon, respectively. Preferably, a dielectric coating film is formed on a surface of at least anode lead tab 7A.

Next, sheet member 14 is disposed at a region preventing contact between electrode foils 2, 3 and the edge of winding core 13 (step S102). Examples of the region preventing contact between electrode foils 2, 3 and the edge of winding core 13 include a surface on an outer circumferential side of the winding start portion of anode foil 2, a surface on an inner circumferential side of the winding start portion of anode foil 2, a surface on an outer circumferential side of the winding start portion of cathode foil 3, a surface on an inner circumferential side of the winding start portion of cathode foil 3, and the like. Sheet member 14 only needs to be disposed to cover at least one of these surfaces.

Subsequently, anode foil 2 and cathode foil 3 are wound with no separator being interposed therebetween (step S103), and the outermost periphery is secured with winding stop tape 5. Thereby, capacitor element 6 is fabricated.

Then, fabricated capacitor element 6 is subjected to chemical conversion treatment of a cut section, and a dielectric coating film is formed on end surfaces of anode foil 2 and cathode foil 3. Chemical conversion treatment of a cut section is performed by immersing the capacitor element in a chemical conversion solution and applying voltage.

Subsequently, a conductive polymer layer is formed at a gap between anode foil 2 and cathode foil 3 of capacitor element 6 by electrolytic polymerization or chemical polymerization. The conductive polymer layer preferably contains at least one or more conductive polymers of the aliphatic series, the aromatic series, the heterocyclic series, and the heteroatom-containing series. In particular, a polythiophene, polypyrrole, or polyaniline conductive polymer is preferable. Further, instead of a conductive polymer, capacitor element 6 may be impregnated with an electrolytic solution.

Thereafter, capacitor element 6 is accommodated in bottomed case 9, and sealing member 10 is inserted into the opening end portion of bottomed case 9, which is then subjected to pressing in a lateral direction and curling. Then, seat plate 11 is provided on a curled surface, and leads 8A and 8B are pressed and bent as electrode terminals to complete electrolytic capacitor 1.

As described above, according to the present embodiment, an electrolytic capacitor can be fabricated without using a separator by forming a conductive polymer layer on the surfaces of anode foil 2 and cathode foil 3 beforehand. Further, contact between electrode foils 2, 3 and the edge portion of winding core 13 of the winding machine can be prevented by inserting sheet member 14 in the winding start portions of the electrode foils of capacitor element 6 and winding them together. A short circuit between anode foil 2 and cathode foil 3 can be avoided by preventing damage to the electrode foils due to contact between the electrode foils and the winding core. Therefore, an electrolytic capacitor capable of having a lower ESR, a larger capacity, and a smaller size can be manufactured.

EXAMPLES REGARDING THE FIRST EMBODIMENT

Example 1

Firstly, etching treatment was performed on the surfaces of anode foil 2 and cathode foil 3 made of aluminum. Thereafter, a dielectric coating film made of $Al_2O_3$ was formed by immersing anode foil 2 subjected to etching treatment in an aqueous solution containing adipic acid and applying voltage.

Subsequently, a conductive polymer layer made of a polythiophene conductive polymer was formed on the surfaces of anode foil 2 and cathode foil 3.

Next, anode lead tab 7A and cathode lead tab 7B were connected to anode foil 2 and cathode foil 3 having the conductive polymer layers formed on the surfaces thereof, respectively.

Then, anode foil 2 and cathode foil 3 were wound together. On this occasion, protection members 4 made of Manila hemp were inserted at positions shown in FIG. 3, and wound together with anode foil 2 and cathode foil 3. After winding, the outermost periphery was secured with winding stop tape 5 to fabricate capacitor element 6.

Subsequently, capacitor element 6 was subjected to chemical conversion treatment of a cut section. Chemical conversion treatment of a cut section was performed by immersing capacitor element 6 in a chemical conversion solution and applying voltage.

Then, fabricated capacitor element 6 was impregnated with a polymerization liquid containing 3,4-ethylenedioxythiophene that forms a conductive polymer by polymerization and a ferric p-toluenesulfonic acid alcohol solution as an oxidant solution. Then, thermochemical polymerization was performed by applying heat to capacitor element 6 to form a conductive polymer layer between anode foil 2 and cathode foil 3

Thereafter, capacitor element 6 was accommodated in bottomed case 9, and sealing member 10 was inserted into the opening end portion of bottomed case 9, which was then subjected to pressing in a lateral direction and curling. Then, seat plate 11 was provided on a curled surface, and leads 8A and 8B were pressed and bent to complete electrolytic capacitor 1.

Example 2

An electrolytic capacitor was fabricated as in Example 1 except for using aramid fiber as protection member 4.

Example 3

An electrolytic capacitor was fabricated as in Example 1 except for using fluororesin as protection member 4.

Example 4

An electrolytic capacitor was fabricated as in Example 1 except for using a polythiophene conductive polymer as protection member 4.

Example 5

An electrolytic capacitor was fabricated as in Example 1 except for performing winding with protection members 4 being formed at positions corresponding to the positions where the protection members were inserted in Example 1, by applying epoxy resin to the positions and drying the resin beforehand, instead of inserting protection members 4 at the time of winding. Specifically, protection members 4 made of epoxy resin were formed at positions corresponding to the positions where protection members 4A to 4D of FIG. 3 are disposed.

Comparative Example 1

An electrolytic capacitor was fabricated as in Example 1 except for performing winding without using protection member 4.

Conventional Example 1

An electrolytic capacitor was fabricated as in Example 1 except for fabricating a capacitor element by winding anode foil 2 and cathode foil 3 having no conductive polymer layer formed on the surfaces thereof, together with a separator sheet made of Manila hemp, without using protection member 4.

Table 1 shows measurement results of electric properties indicating average values of 30 electrolytic capacitors for each of Examples 1 to 5, Comparative Example 1, and Conventional Example 1. The electrolytic capacitors had a rated voltage of 4 V, a capacitance of 560 μF, and dimensions of 8 mm in diameter and 12 mm in height. The capacitance and tan δ were measured at a frequency of 120 Hz, and the equivalent series resistance was measured at a frequency of 100 kHz. Further, the leak current indicates a value obtained two minutes after application of the rated voltage.

TABLE 1

| | Protection Member | | | Separator | Capacitance | tanδ | Equivalent Series Resistance | Leak Current |
|---|---|---|---|---|---|---|---|---|
| | Type | Insertion | Application | Sheet | (μF) | (%) | (mΩ) | (μA) |
| Example 1 | Manila hemp | inserted | — | — | 572 | 1.3 | 10 | 24 |
| Example 2 | aramid fiber | inserted | — | — | 569 | 1.4 | 11 | 20 |
| Example 3 | fluororesin | inserted | — | — | 563 | 1.5 | 11 | 20 |
| Example 4 | polythiophene | inserted | — | — | 576 | 1.2 | 10 | 21 |
| Example 5 | epoxy resin | — | applied | — | 561 | 1.4 | 12 | 22 |
| Comparative Example 1 | — | — | — | — | 571 | 1.3 | 10 | 34 |
| Conventional Example 1 | — | — | — | provided | 570 | 1.3 | 15 | 27 |

As can be seen from the results in Table 1, the equivalent series resistances of the electrolytic capacitors according to Examples 1 to 5 and Comparative Example 1 are lower than that of the electrolytic capacitor in Conventional Example 1. Therefore, an electrolytic capacitor having a low equivalent series resistance can be fabricated by forming a conductive polymer layer on surfaces of an anode foil and a cathode foil and eliminating a separator.

Further, the leak currents of the electrolytic capacitors according to Examples 1 to 5 are lower than that of the electrolytic capacitor in Comparative Example 1. Therefore, in an electrolytic capacitor in which a conductive polymer layer is formed on surfaces of an anode foil and a cathode foil and a separator is eliminated, an increase in leak current can be suppressed by covering connection portions between the anode foil and the cathode foil and lead tabs with protection members.

Further, since no separator is used in the electrolytic capacitors according to Examples 1 to 5 and Comparative Example 1, the electrolytic capacitors can have a diameter smaller than that of the electrolytic capacitor according to Conventional Example 1. That is, an electrolytic capacitor having a smaller size can be provided.

Further, since no separator is used in the electrolytic capacitors according to Examples 1 to 5 and Comparative Example 1, capacitor elements with a diameter smaller than that of the capacitor element of Conventional Example 1 were fabricated. In the case where the capacitor elements of Examples 1 to 5 and Comparative Example 1 and the capacitor element of Conventional Example 1 have the same diameter, the electrolytic capacitors of Examples 1 to 5 and Comparative Example 1 have a capacitance 1.6 times that of the electrolytic capacitor according to Conventional Example 1 with the same diameter. That is, an electrolytic capacitor having a larger capacity can be provided.

Examples Regarding the Second Embodiment

Example 6

Firstly, etching treatment was performed on the surfaces of anode foil 2 and cathode foil 3 made of aluminum. Thereafter, a dielectric coating film made of $Al_2O_3$ was formed by immersing anode foil 2 subjected to etching treatment in an aqueous solution containing adipic acid and applying voltage.

Subsequently, a conductive polymer layer made of a polythiophene conductive polymer was formed on the surfaces of anode foil 2 and cathode foil 3.

Next, anode lead tab 7A and cathode lead tab 7B were connected to anode foil 2 and cathode foil 3 having the conductive polymer layers formed on the surfaces thereof, respectively.

Then, sheet members 14A and 14B made of Manila hemp were disposed at positions covering the winding start portions at end portions of anode foil 2 and cathode foil 3 as shown in FIG. 7A, and anode foil 2, cathode foil 3, and sheet members 14A and 14B were wound together by rotating winding core 13 in the clockwise direction, as shown in FIG. 7B. After winding, the outermost periphery was secured with winding stop tape 5 to fabricate capacitor element 6.

Subsequently, capacitor element 6 was subjected to chemical conversion treatment of a cut section. Chemical conversion treatment of a cut section was performed by immersing capacitor element 6 in a chemical conversion solution and applying voltage.

Then, fabricated capacitor element 6 was impregnated with a polymerization liquid containing 3,4-ethylenedioxythiophene that forms a conductive polymer by polymerization and a ferric p-toluenesulfonic acid alcohol solution as an oxidant solution. Then, thermochemical polymerization was performed by applying heat to capacitor element 6 to form a conductive polymer layer between anode foil 2 and cathode foil 3.

Thereafter, capacitor element 6 was accommodated in bottomed case 9, and sealing member 10 was inserted into the opening end portion of bottomed case 9, which was then subjected to pressing in a lateral direction and curling. Then, seat plate 11 was provided on a curled surface, and leads 8A and 8B were pressed and bent to complete electrolytic capacitor 1.

Example 7

An electrolytic capacitor was fabricated as in Example 6 except for using aramid fiber as sheet member 14.

Example 8

An electrolytic capacitor was fabricated as in Example 6 except for using fluororesin as sheet member 14.

Example 9

An electrolytic capacitor was fabricated as in Example 6 except for using a polythiophene conductive polymer as sheet member 14.

Example 10

The winding method in Example 10 was different from that in Example 6. As shown in FIG. 9A, sheet members 14A and 14B made of Manila hemp were disposed such that one end portions thereof covered the winding start portions at end portions of anode foil 2 and cathode foil 3, and the other end portions thereof extended from the winding start portions of anode foil 2 and cathode foil 3 to between winding core pieces 13A and 13B. Then, an electrolytic capacitor was fabricated as in Example 6 except for rotating winding core 13 in the clockwise direction to wind sheet members 14A and 14B and causing one end portions of anode foil 2 and cathode foil 3 to be caught in sheet members 14A and 14B and wound together.

Example 11

An electrolytic capacitor was fabricated as in Example 10 except for using aramid fiber as sheet member 14.

Example 12

An electrolytic capacitor was fabricated as in Example 10 except for using fluororesin as sheet member 14.

Comparative Example 2

An electrolytic capacitor was fabricated as in Example 6 except for performing winding without using sheet member 14.

Conventional Example 2

In Conventional Example 2, an electrolytic capacitor was fabricated as in Example 6 except for fabricating a capacitor element by winding anode foil 2 and cathode foil 3 having no conductive polymer layer formed on the surfaces thereof, together with a separator sheet made of Manila hemp, without using sheet member 14.

Table 2 shows measurement results of electric properties indicating average values of 30 electrolytic capacitors for each of Examples 6 to 12, Comparative Example 2, and Conventional Example 2. The electrolytic capacitors had a rated voltage of 4 V, a capacitance of 560 μF, and dimensions of 8 mm in diameter and 12 mm in height. The capacitance and tan δ were measured at a frequency of 120 Hz, and the equivalent series resistance was measured at a frequency of 100 kHz. Further, the leak current indicates a value obtained two minutes after application of the rated voltage.

TABLE 2

| | Sheet Member | Separator Sheet | Capacitance (μF) | tanδ (%) | Equivalent Series Resistance (mΩ) | Leak Current (μA) |
|---|---|---|---|---|---|---|
| Example 6 | Manila hemp | — | 567 | 1.3 | 10 | 28 |
| Example 7 | aramid fiber | — | 565 | 1.3 | 10 | 26 |
| Example 8 | fluororesin | — | 563 | 1.5 | 11 | 24 |
| Example 9 | polythiophene | — | 570 | 1.3 | 10 | 22 |
| Example 10 | Manila hemp | — | 575 | 1.3 | 10 | 22 |
| Example 11 | aramid fiber | — | 573 | 1.4 | 10 | 22 |
| Example 12 | fluororesin | — | 571 | 1.5 | 11 | 21 |
| Comparative Example 2 | — | — | 577 | 1.3 | 10 | 54 |
| Conventional Example 2 | — | provided | 570 | 1.3 | 15 | 20 |

As can be seen from the results in Table 2, the equivalent series resistances of the electrolytic capacitors according to Examples 6 to 12 and Comparative Example 2 are lower than that of the electrolytic capacitor in Conventional Example 2. Therefore, an electrolytic capacitor having a low equivalent series resistance can be fabricated by forming a conductive polymer layer on surfaces of an anode foil and a cathode foil and eliminating a separator.

Further, the leak currents of the electrolytic capacitors according to Examples 6 to 12 are lower than that of the electrolytic capacitor in Comparative Example 2. Therefore, in an electrolytic capacitor in which a conductive polymer layer is formed on surfaces of an anode foil and a cathode foil and a separator is eliminated, an increase in leak current can be suppressed by disposing a sheet member to prevent contact between the anode foil and the cathode foil and an edge portion of a winding core.

Further, since no separator is used in the electrolytic capacitors according to Examples 6 to 12 and Comparative Example 2, the electrolytic capacitors can have a diameter smaller than that of the electrolytic capacitor according to Conventional Example 2. That is, an electrolytic capacitor having a smaller size can be provided.

Further, since no separator is used in the electrolytic capacitors according to Examples 6 to 12 and Comparative Example 2, capacitor elements with a diameter smaller than that of the capacitor element of Conventional Example 2 were fabricated. In the case where the capacitor elements of Examples 6 to 12 and Comparative Example 2 and the capacitor element of Conventional Example 2 have the same diameter, the electrolytic capacitors of Examples 6 to 12 and Comparative Example 2 have a capacitance 1.6 times that of the electrolytic capacitor according to Conventional Example 2 with the same diameter. That is, an electrolytic capacitor having a larger capacity can be provided.

The embodiments and examples described above are merely provided to describe the present invention, and should not be interpreted as restricting the invention described in the scope of claims. The present invention can be freely modified within the scope of claims and within the scope having equivalent meaning.

What is claimed is:

1. An electrolytic capacitor, comprising: an anode foil having a dielectric coating film and a conductive polymer layer formed successively on a surface thereof; a cathode foil having a conductive polymer layer formed on a surface thereof; an anode lead tab electrically connected to one surface of said anode foil; a cathode lead tab electrically connected to one surface of said cathode foil; and a protection member disposed on the surface(s) of said anode foil and/or said cathode foil, wherein said anode foil and said cathode foil are wound with no separator being interposed therebetween, and a first region provided with said protection member and a second region not provided with said protection member are present between said anode foil and said cathode foil that are wound, and said first region is at least one of a region covering said anode lead tab connected to said anode foil, a region covering said cathode lead tab connected to said cathode foil, a region covering a rear side of said anode foil at a connection portion between said anode lead tab and said anode foil, and a region covering a rear side of said cathode foil at a connection portion between said cathode lead tab and said cathode foil; wherein said first region includes all of the region covering said anode lead tab connected to said anode foil, the region covering said cathode lead tab connected to said cathode foil, the region covering the rear side of said anode foil at the connection portion between said anode lead tab and said anode foil, and the region covering the rear side of said cathode foil at the connection portion between said cathode lead tab and said cathode foil.

2. The electrolytic capacitor according to claim 1, wherein said protection member extends in a winding direction of a capacitor element, within a range of half a perimeter or less.

3. The electrolytic capacitor according to claim 1, wherein said protection member is a sheet-type member made of any of a natural fiber, a synthetic resin, and a conductive polymer.

4. The electrolytic capacitor according to claim 1, wherein said second region is filled with a conductive polymer.

5. A method of manufacturing an electrolytic capacitor, comprising the steps of: successively forming a dielectric coating film and a conductive polymer layer on a surface of an anode foil, and forming a conductive polymer layer on a surface of a cathode foil; connecting an anode lead tab and a cathode lead tab to one surface of said anode foil and one surface of said cathode foil, respectively; disposing a protection member at least one of a region covering said anode lead tab connected to said anode foil, a region covering said cathode lead tab connected to said cathode foil, a region covering a rear side of said anode foil at a connection portion between said anode lead tab and said anode foil, and a region covering a rear side of said cathode foil at a connection portion between said cathode lead tab and said cathode foil; and winding said anode foil and said cathode foil with no separator being interposed therebetween, wherein said protection member is formed by applying resin to all of the region covering said anode lead tab connected to said anode foil, the region covering said cathode lead tab connected to said cathode foil, the region covering the rear side of said anode foil at the connection portion between said anode lead tab and said anode foil, and the region covering the rear side of said cathode foil at the connection portion between said cathode lead tab and said cathode foil.

6. An electrolytic capacitor, comprising:
an anode foil having a dielectric coating film and a conductive polymer layer formed successively on a surface thereof;
a cathode foil having a conductive polymer layer formed on a surface thereof; and
a sheet member disposed to cover at least one of a surface on an outer circumferential side of a winding start portion of said anode foil, a surface on an inner circumferential side of the winding start portion of said anode foil, a surface on an outer circumferential side of a winding start portion of said cathode foil, and a surface on an inner circumferential side of the winding start portion of said cathode foil,
said anode foil and said cathode foil being wound with no separator being interposed therebetween.

7. The electrolytic capacitor according to claim 6, wherein one end of the sheet member extends in a longitudinal direction from one end of the winding start portion of said anode foil and/or one end of the winding start portion of said cathode foil.

8. The electrolytic capacitor according to claim 6, wherein said sheet member is made of any of a natural fiber, a synthetic resin, and a conductive polymer.

9. The electrolytic capacitor according to claim 6, wherein a gap between said anode foil and said cathode foil is filled with a conductive polymer.

10. A method of manufacturing an electrolytic capacitor, comprising the steps of:
successively forming a dielectric coating film and a conductive polymer layer on a surface of an anode foil, and forming a conductive polymer layer on a surface of a cathode foil;
disposing a sheet member to cover at least one of a surface on an outer circumferential side of a winding start portion of said anode foil, a surface on an inner circumferential side of the winding start portion of said anode foil, a surface on an outer circumferential side of a winding start portion of said cathode foil, and a surface on an inner circumferential side of the winding start portion of said cathode foil; and
winding said anode foil and said cathode foil with no separator being interposed therebetween.

11. The method of manufacturing an electrolytic capacitor according to claim 10, wherein
in said step of disposing a sheet member, said sheet member is disposed to extend in a longitudinal direction from one end of the winding start portion of said anode foil and/or one end of the winding start portion of said cathode foil, and
in said step of winding, firstly, only said sheet member extending from said one end is wound, and then the one ends of said anode foil and said cathode foil are wound together with said sheet member.

* * * * *